United States Patent [19]

Reed

[11] Patent Number: 4,508,698

[45] Date of Patent: Apr. 2, 1985

[54] PROCESS AND SYSTEM FOR PRODUCING AND RECOVERING ELEMENTAL SULFUR

[75] Inventor: Robert L. Reed, Tulsa, Okla.

[73] Assignee: Standard Oil Company (Indiana), Chicago, Ill.

[21] Appl. No.: 527,903

[22] Filed: Aug. 30, 1983

[51] Int. Cl.³ .............................................. C01B 17/04
[52] U.S. Cl. ................................ 423/574 R; 423/576
[58] Field of Search ............... 423/574 R, 574 G, 576; 422/115, 171, 190

[56] References Cited

U.S. PATENT DOCUMENTS

| Re. 28,830 | 5/1976 | Hunt, Jr. et al. | 423/574 R |
|---|---|---|---|
| 2,767,062 | 10/1956 | Duecker | 423/576 |
| 4,035,474 | 7/1977 | Kunkel et al. | 423/574 R |
| 4,180,554 | 12/1979 | Goddin, Jr. et al. | 423/574 R |
| 4,309,402 | 1/1982 | Al-Muddaris | 423/574 R |
| 4,315,904 | 2/1982 | Lell et al. | 423/574 R |

FOREIGN PATENT DOCUMENTS 938087 12/1973 Canada ............................. 423/574 R

OTHER PUBLICATIONS

"MCRC Process for Improving Claus Plant Recovery'-'—A. B. Coady, 6-9-1976; Presented to Canadian Natural Gas Processor's Assoc.
"MAXISULF-A Process to Enhance Sulphur Recovery In Claus Plants"—R. Lell and U. Neumann, Davy McKee AG.
"The MCRC Sub-Dewpoint Sulphur Recovery Process"—R. E. Heigold and D. E. Berkeley, Delta Projects Limited.

Primary Examiner—Earl C. Thomas
Assistant Examiner—Jeffrey E. Russel

[57] ABSTRACT

A straight-through three reactor system and process produces acceptable levels of sulfur recovery from acid gas at a cost significantly less than that required for a standard modified four reactor Claus system. The system includes two conventional Claus reactors and one cold bed adsorption (CBA) reactor in series. Four condensers are provided, one disposed before each of the catalytic reactors, and one disposed after the CBA reactor. The system is designed to operate either in a recovery mode or in a regeneration mode. In the recovery mode, the reactors are in series and the last reactor is operated below dew point of sulfur (CBA reactor). In regeneration mode, effluent from the third condenser is heated in a first heat exchanger where effluent from the first catalytic reactor is used as the heat source. Sulfur is vaporized in the CBA reactor and is recovered in the fourth condenser. Effluent from the fourth condenser is then passed to an incinerator.

9 Claims, 4 Drawing Figures

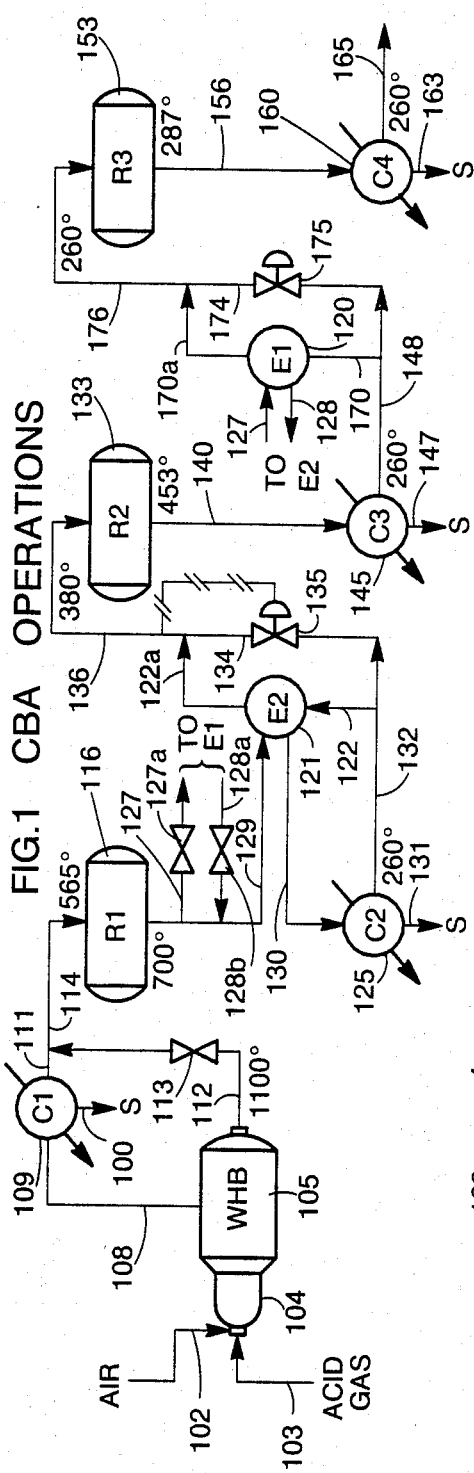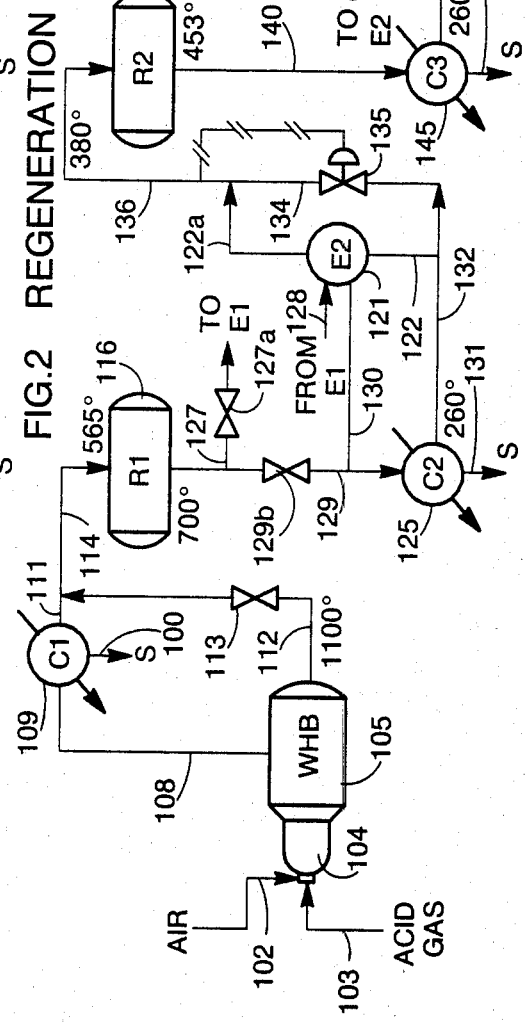

REACTOR 3
EFFLUENT TEMPERATURE

REHEAT EXCHANGER CONFIGURATIONS

PROCESS AND SYSTEM FOR PRODUCING AND RECOVERING ELEMENTAL SULFUR

FIELD OF THE INVENTION

This invention relates to processes and systems for producing elemental sulfur. In particular, it relates to recovering elemental sulfur from acid gas using an improved modified Claus process in which sulfur is deposited on the catalyst.

BACKGROUND OF THE INVENTION

The Claus process is widely used by the industry for the production of elemental sulfur. The process is designed to carry out the Claus reaction:

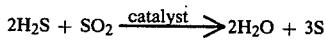

$$2H_2S + SO_2 \xrightarrow{catalyst} 2H_2O + 3S$$

The reaction is favored by decreased temperature and by removal of elemental sulfur vapor.

In the conventional (high temperature) Claus process, the operating conditions of the reactors in which the Claus reaction is carried out are selected to maintain elemental sulfur in the vapor state. Otherwise, the elemental sulfur would deposit on the catalyst and deactivate it. To assure high conversion rates, the reaction is carried out in a plurality of consecutive reactors. Elemental sulfur is condensed and removed from the effluent of a preceding reactor before the effluent is passed to a subsequent reactor. The removal of sulfur permits the reactors to be maintained at progressively reduced temperatures.

Generally, the desired recovery levels necessitate the use of a modified (adsorptive or low-temperature) Claus process which includes a thermal reactor, two catalytic reactors and two low temperature catalytic reactors, such as cold bed adsorption (CBA) reactors. The reaction in a CBA reactor is generally carried out at a temperature range which results in the condensation of elemental sulfur on the alumina catalyst, as an example, from about 250°–280° F. (121°–138° C). The low temperatures in the CBA reactor favor the reaction and the condensation of sulfur removes it from the reaction phase thereby allowing more $H_2S$ and $SO_2$ to react. The sulfur condensing on the catalyst deactivates it. Accordingly, a second CBA reactor is provided so that while the first CBA reactor is in the recovery mode, the second reactor is being regenerated and vice versa.

Although acceptable recovery rates can be achieved by the above-described modified Claus process, the capital expenditures and operation costs for such processes are quite high. One of the major factors contributing to the expense of such a process are the reactors. The elimination of one of the reactors from the modified Claus process would significantly reduce both overall captial expenditures and operation costs. However, this would in turn significantly lower the recovery rate thereby necessitating additional treatment of the tail gas to minimize pollution problems. Such treatment of tail gas by the conventional Scot or the Beavon process is expensive and consumes significant amounts of energy. Additionally, the lower recovery rate would decrease the overall recovery of elemental sulfur and hence adversely affect the economics of the process.

A number of processes have been designed in an attempt to achieve acceptable recovery rates at lower costs. Delta Engineering Corporation's MCRC Process uses three catalytic reactors. The first catalytic reactor operates above the dew point of sulfur throughout the process. One of the remaining two reactors, a low temperature reactor, is operated below the dew point of sulfur while the other reactor is being regenerated. When the catalyst in the low temperature reactor becomes deactivated due to sulfur deposits, the inputs to the two reactors are switched so that the catalyst in the reactor which was operated at a low temperature is regenerated by the high temperature gas and the reactor with the regenerated catalyst therein is operated at a temperature below the dew point of sulfur. The reactor operating in the regeneration mode is fed with a gas stream from the heat exchanger after the first catalytic reactor. The three catalytic reactors do not acheive acceptable recovery rates. Accordingly, in order to obtain the desired 98% average recovery rate, a coalescer must be added behind the third catalytic reactor. The coalescer, of course, adds to the overall cost of the system and therefore diminishes the savings achieved by the elimination of a catalytic reactor.

Another prior art process which attempts to acheive acceptable recovery levels at reduced cost is the Maxisulf system of Davy McKee AG. The Maxisulf process provides two low temperature reactors, one of which operates as the low temperature reactor while the other is regenerated. The regeneration of the low temperature catalytic reactor is accomplished by forcing therethrough a stream of hot gas from an inline burner. The hot gas flows through the reactor in the opposite direction from that of the low temperature gas.

This process suffers from several drawbacks. First, the alternating directions of flow accelerates the degradation of the catalyst. Second, the process utilizes an extra burner and fuel gas, both of which increase the overall cost. Third, the process introduces a dangerous condition. If oxygen is present in the regeneration gas stream, it can sulfate and therefore deactivate the catalyst. This problem can be overcome by contacting the regeneration gas with $H_2S$, but each step would further add to the cost of the process. Fourth, the quality of the fuel gas must be carefully controlled to avoid the introduction of unburned hydrocarbons into the low temperature reactor. Otherwise, the hydrocarbon would be cracked and produce a tar, which, in turn, would coat and therefore deactivate the catalyst. Finally, the inline burner adds an additional volume of gas which must be treated and processed.

Thus, the prior art processes have not been entirely successful in solving the problem of reducing the overall cost of the modified Claus process. There is therefore a long-felt and still unsatisfied need for a process and a system that would require fewer reactors than the conventional modified Claus process, but acheive the required overall recovery of sulfur without the need for a further treatment of the tail gas and without the need for additional expensive components of the system. The present invention achieves the above-stated goal.

BRIEF DESCRIPTION OF THE INVENTION

The present invention significantly improves the efficiency and the economy of processes and systems for the production of elemental sulfur from acid gas. The process and system of the present invention achieves an acceptable recovery rate of elemental sulfur from acid gas using only three catalytic reactors. This is achieved by providing a straight through process incorporating two Claus catalytic reactors operating above the dew point of sulfur and one low temperature reactor such as a CBA reactor.

The process of the present invention is designed to operate in two modes: a recovery mode and a regeneration mode. In the recovery mode, the process of the present invention operates in the same manner as a conventional modified Claus process except that there is no second low temperature reactor. When the catalyst loading in the third reactor reaches a level less than that where the activity of the catalyst in the low temperature reactor (i.e., the third catalytic reactor) falls below an acceptable level, i.e., falls below a predetermined rate the process is switched to the regeneration mode.

In the regeneration mode, effluent from the third condenser (i.e., the condenser preceding the CBA reactor) is heated in an exchanger and is then fed to the CBA reactor. The effluent from the third catalytic reactor is passed through a fourth condenser where sulfur is recovered. Then the effluent from the condenser is removed to the incinerator.

The recovery of sulfur during the regeneration mode is lowered but remains at acceptable levels. Since the gas fed into the third reactor is at a high temperature, the vaporization of sulfur takes a relatively short period of time.

Another aspect of this invention that contributes to high recovery is the absence of switching valves. Since there are no switching valves, there can be no leakage of rich regeneration gas into the tail gas line as can happen in the standard low-temperature (sub-dew point) processes.

Accordingly, the overall average recovery is within acceptable levels even though only three catalytic reactors are used in the process.

BRIEF DESCRIPTION OF THE DRAWINGS

FIG. 1 is a schematic of a preferred embodiment of the process and the system of the present invention operating in the recovery mode.

FIG. 2 is a schematic of a preferred embodiment of the process and the system of the present invention operating in the regeneration mode.

DETAILED DESCRIPTION OF THE INVENTION

Figure 3:
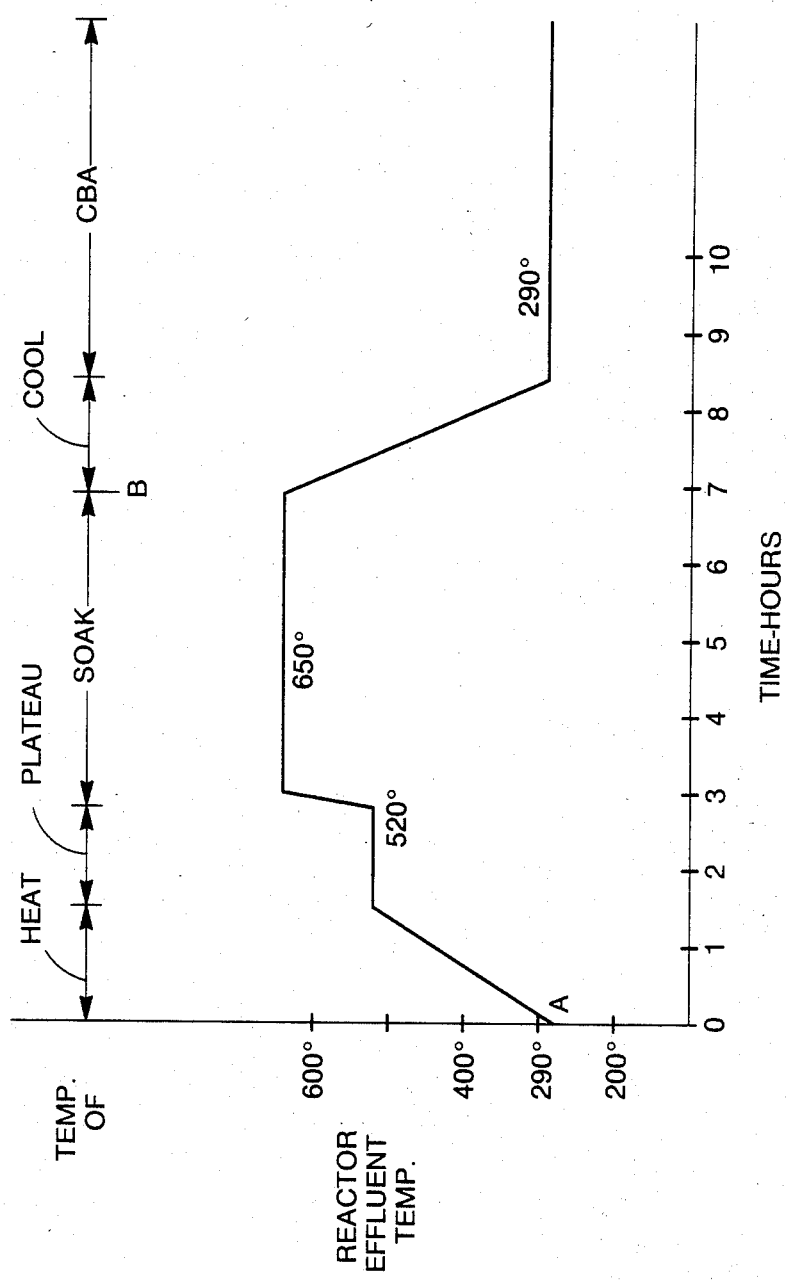
FIG. 3 depicts the temperature cycle the CBA reactor undergoes during a complete cycle of adsorption and regeneration.

The present invention provides a process and a system for inexpensive and efficient production of elemental sulfur from an acid gas. The economy of the process is acheived by the elimination of one of the low temperature reactors from the conventional modified Claus system. The process and system of the present invention are designed to produce acceptable recovery rates without a second low temperature catalytic reactor and without adding additional expensive equipment for further treatment of the tail gas or for effecting regeneration of the catalyst.

The system of the present invention is designed to operate in two modes: the recovery mode and the regeneration mode. In the recovery mode, acid gas and air are fed into a conventional Claus thermal reactor. The effluent from the thermal reactor is cooled in a waste heat boiler, passed through a first condenser to remove sulfur and fed into a first catalytic reactor which is operated generally at a temperature in the range of 450°–650° F. (232°–343° C.). The effluent from the first catalytic reactor is cooled in a heat exchanger and passed through a second condenser to remove additional sulfur. From the second condenser, the gas stream is heated and passed to a second catalytic reactor at an inlet temperature in the range of about 350°–420° F. (177°–216° C.). The effluent from the second catalytic reactor is pased through a third condenser where more elemental sulfur is recovered. The effluent from the third condenser is then fed into a low temperature catalytic reactor such as a cold bed adsorption (CBA) reactor. The low temperature catalytic reactor is operated at a temperature effective for adsorbing free sulfur on the catalyst, generally, for example, at a temperature in the range of about 250°–280° F. (121°–138° C.) which results in the condensation of elemental sulfur on the alumina catalyst. Before the catalyst is deactivated to the point where the recovery of sulfur is insufficient, the process is switched into the regeneration mode.

In the regeneration mode, gases leaving the third condenser are heated in a heat exchanger using, in one embodiment, effluent from the first catalytic reactor as the heat source. These gases are fed into the low temperature (CBA) reactor at a temperture in the range of about 625°–675° F. (329°–357° C.).

In the reactor, the hot gas heats up and vaporizes the sulfur which is deposited on the alumina catalyst. The effluent from the catalytic reactor is cooled in a fourth condenser and additional sulfur is recovered. The effluent is then directed to an incinerator.

The recovery levels during regeneration drop for only a short period of time. Additionally, the system is operated in the regeneration mode only about 20 to 30 percent of the total operation time. Accordingly, the lowered recoveries during regeneration decrease only slightly the average recovery of sulfur for the entire operation. Furthermore, the recovery of sulfur remains within acceptable levels throughout the operation.

The system and process of the present invention offer a range of advantages in efficiency and economy. First, all condensers except the first are operated at about 260° F. (127° C.). This results in maximum recovery and reduced investment costs. Second, the process flow is steady, straight through and downflow through all the reactors. This results in a plant that is easy to control. Third, there are no switching valves on the process flow lines. This advantage presents significant cost savings because these valves are very expensive. A concomitant advantage is that the absence of switching valves precludes leakage of rich regeneration gas into the tail gas line. This advantage presents high recovery levels. Further, because this process and system incorporates only three catalytic reactors altogether and because expensive switching valves are not required, a plant constructed pursuant to this invention will cost much less than the standard modified Claus process (two Claus reactors and two CBA reactors). Finally, operating costs are greatly reduced because there is a significantly lesser pressure drop when the present system and process is used.

The present invention will now be described in connection with the preferred embodiment depicted in the drawings.

DESCRIPTION OF THE PREFERRED EMBODIMENT OF THE PRESENT INVENTION

FIGS. 1 and 2 depict the preferred embodiment of the process and the system of the present invention. FIG. 1 shows the operation of the process of the present invention in the recovery mode (CBA operation) and FIG. 2 shows the operation of the process of the present invention in the regeneration mode. Like numbered elements in FIGS. 1 and 2 refer to identical elements.

Referring now to FIG. 1, air and acid gas are fed into a thermal reactor 104 via lines 102 and 103, respectively. Effluent gases from the thermal reactor 104 are cooled in a waste heat boiler 105 (WHB). The resulting gases at about 550° F. (288° C.) are passed via a line 108 to a first condenser 109 which condenses vaporized sulfur. The gases leave the first condenser 109 via a line 111 at about 400° F. (204° F.). Sulfur is removed from condenser 109 via a line 100 and recovered.

Hot bypass gas at a temperature of about 1100° F. (593° C.) from the waste heat boiler 105 is introduced via a line 112 and a valve 113 into the gas stream 111 leaving the first condenser 109, such that the resulting gas stream 114 is at a temperature of about 450°–650° F. (232°–343° C.). This high inlet temperature is required in order to provide an effluent temperature from a first catalytic reactor 116 of about 650°–700° F. (343°–371° C.). The gas stream 14 is passed to the first catalytic reactor 116 (R1) where further conversion of H$_2$S and SO$_2$ into elemental sulfur takes place. The effluent from the first catalytic reactor 116 is directed to a second heat exchanger 121 (E2) via a line 129. Then the gas stream is passed via a line 130 to a second condenser 125 where it is cooled to about 260° F. (127° C.). Sulfur is recovered from the second condenser 125 via a line 131. A portion of the effluent from the second condenser 125 is passed via a line 132 and a valve 135 and a line 134 to a line 136. Another portion of the effluent is passed via a line 122 through the second heat exchanger 121 (E2) and line 122a into the line 136. The valve 135 regulates the relative proportions of flow through lines 122 and 134 to achieve the desired temperature in the line 136. In the preferred embodiment the temperature of gases in line 136 fed into the second catalytic reactor 133 (R2) is about 380° F. In the second catalytic reactor 133 (R2), additional sulfur vapor is produced and the gases exit at about 453° F. via a line 140 and enter the third condenser 145. The third condenser 145 is maintained at about 260° F. Sulfur is removed from the condenser 145 via a line 147. The effluent from the condenser 145 is passed to a line 176 via a line 148, a line 174, and a valve 175, or is passed via a line 170, through the first heat exchanger 120 (E1) and line 170a. Valve 175 controls the proportion of stream 148 flowing through the heat exchanger 120 and through line 174.

The heating medium of the first heat exchanger 120 (E1) is the effluent from the first catalytic reactor 116 (R1). A valve 127a controls the flow rate through line 127 from line 129 and therefore controls the heat in the first heat exchanger 120 (E1). The cooled effluent is passed from the first heat exchanger 120 (E1) to the second heat exchanger 121 (E2) or returned via the lines 128 and 128a and valve 128b to the line 129 which enters second heat exchanger 121 (E2). (See also FIG. 2.)

In the preferred embodiment, the temperature in line 176 fed into the third catalytic (CBA) reactor is about 260° F. (127° C.). The CBA reactor 153 is generally maintained at a temperature in the range of about 250° F. to 290° F. (121°–143° C.). Effluent from the CBA reactor 153 at about 287° F. (141° C.) is passed via a line 156 to a fourth condenser 160. The gas stream exits from the fourth condenser 160, maintained at about 260° F. (127° C.) via a line 165 to incinerator (not shown).

The operation in the recovery mode is continued until a predetermined catalyst loading is achieved, preferably less than that at which the catalyst in the CBA reactor 153 becomes significantly deactivated by sulfur deposits. At that point, the operation of the system is switched to the regeneration mode shown in FIG. 2.

Referring now to FIG. 2, air 102 and acid gas 103 are fed to furnace 104 and the effluent gases from the waste heat boiler 105 are split. One portion is cooled in the boiler 105 to about 550° F. (288° C.) and passed via the line 108 to a first condenser 109 which condenses vaporized sulfur. The gases leave the first condenser 109 via the line 111 at about 400° F. (204° C.). The sulfur is removed from the condenser 109 via the line 100 and recovered.

The second portion of the effluent from the waste heat boiler 105 is at a temperature of about 1100° F. (593° C.). It is passed via the line 112 and the valve 113 and combined in the line 114 with gases leaving the first condenser 109 via the line 111. The relative volumes of gases being combined in the line 114 are selected to produce a gas stream at a temperature of about 550°–600° F. (288°–343° C.) preferably at about 565° F. (296° C.). The gas stream 114 flows into the first catalytic reactor 116, where the Claus reaction takes place in the same manner as in the recovery mode. The effluent, at a temperature of about 650°–700° F. (343°–371° C.), is then passed to the first heat exchanger 120 via a line 127 and a valve 127a and from a first heat exchanger is sent via line 128 to the second heat exchanger 121. The reactor 116 effluent in the first heat exchanger 120 serves as the heat source for the regeneration gas leaving the third condenser 145 and entering the CBA reactor 153. The cooled effluent from the first heat exchanger 120 is provided to the second heat exchanger 121 by line 128 and serves as the heat source to reheat the feed to the second Claus catalytic reactor 133. A valve 129b and the valve 127a control the flow of effluent to the exchanger 120 and therefore the temperature thereof.

The effluent from the second heat exchanger 121 passes via line 130 to a second condenser 125. Elemental sulfur is recovered from the condenser 125 via a line 131. The effluent from the second condenser 125 is then divided. One portion is passed via a line 132 and a line 122 through the heat exchanger 121 and then by line 122a to line 136; a second portion is passed via a first bypass line 134 through a first bypass valve 135. The two portions are recombined in line 136 and fed into a second catalytic reactor 133. The temperature of the gas fed into the second catalytic reactor is controlled using the bypass line 134 and a valve 135. The temperature of the gas stream in line 136 is generally about 350°–420° F. (177°–216° C.) and in the preferred embodiment about 380° F. (193° C.). In the second catalytic reactor 133 further conversion of H$_2$S and SO$_2$ into elemental sulfur takes place. The effluent from the second catalytic reactor 133 is passed via a line 140, at about 453° F. (234° C.) into a third condenser 145. The resulting elemental sulfur is recovered from the third condenser 145 via a line 147.

The effluent stream from the third condenser 145, at about 260° F. (127° C.), passes during regeneration via the line 148 and a line 170 through the first heat exchanger 120 and a line 170a. Otherwise, during adsorption the effluent stream can be passed via a second bypass line 174 and a second bypass valve 175. The stream in line 176 is maintained during regeneration at a temperature of about 625°–675° F. (329°–357° C.). The gas stream 176 flows into the CBA reactor 153. Since this stream is at a high temperature, it vaporizes sulfur deposited on the catalyst and thereby restores the catalyst activity.

From the reactor 153 effluent is passed via the line 156 to the condenser 160. The temperature of the effluent in line 156 is in the range of about 287°–650° F. (142°–343° C.) depending on the stage of the regeneration of the reactor 153. The temperature of the condenser 160 is about 260° F. (127° C.). Elemental sulfur is recovered from the condenser 160 via the line 163. The effluent from the condenser 160 is passed via the line 165 to the incinerator (now shown).

During regeneration of the CBA reactor 153, the second catalytic reactor 133 is preferably operated at a very low dew point approach, such as 15° F. (8° C.) or less. This will cause the catalyst in this Claus reactor 133 to lose activity very slowly. When necessary, the inlet temperature to the second reactor may be raised to about 50° F. (28° C.) above normal for at least one adsorption cycle. This will restore catalytic activity in the second Claus reactor 133 without affecting the sulfur recovery.

Regeneration according to this invention with hot, dilute process gases has decided advantages over the standard practice of using hot, rich process gases (e.g., effluent from the first catalytic reactor 116). First, the catalyst is regenerated to a lower equilibrium level of absorbed sulfur because of the lower sulfur vapor content of the regeneration gas. Second, the lower $H_2S$ content of the gas results in a lower corrosion rate of the carbon steel in contact with the gas. Third, the recovery is unaffected by leaks in switching valves since there are no switching valves.

Turning now to FIG. 3, there is shown a graph of temperature versus time for CBA reactor 153.

During regeneration, the third reactor undergoes a heating period during which very little sulfur is vaporized. At about 520° F. (271° C.) (the exact temperature varies somewhat, depending on the actual acid gas composition) the absorbed sulfur is vaporized. The reactor exit temperature remains constant at this "sulfur plateau" temperature until all the sulfur is vaporized. During the sulfur plateau period when the sulfur is being actively vaporized from the catalyst, the reverse Clause reaction occurs:

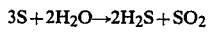

$$3S + 2H_2O \rightarrow 2H_2S + SO_2$$

The amount of the reverse Claus reaction which occurs is a function of the plateau temperature and the partial pressure of the sulfur vapor in the gas stream. Most of the sulfur that is vaporized from the catalyst during the plateau period is recovered as liquid sulfur from condenser 160 via line 163. That which is converted to $H_2S$ and $SO_2$ is lost in the tail gas going to the incinerator. Once all of the sulfur is vaporized, the catalyst heats rapidly to the inlet temperature of about 650° F. (343° C.) where it is held for several hours to "soak" the catalyst and restore its activity. In actual practice, it may be found that the soak period can be shortened. This could increase the calculated recoveries. During the soak period, little reverse Claus reaction is possible because of the small amount of sulfur vapor in the gas. After the soak period, the reheat exchanger is bypassed, the reactor cools rapidly, and the process returns to the normal flow conditions of two Claus and one CBA reactor. The cooling period is considered herein to be part of the regeneration mode.

Figure 4:
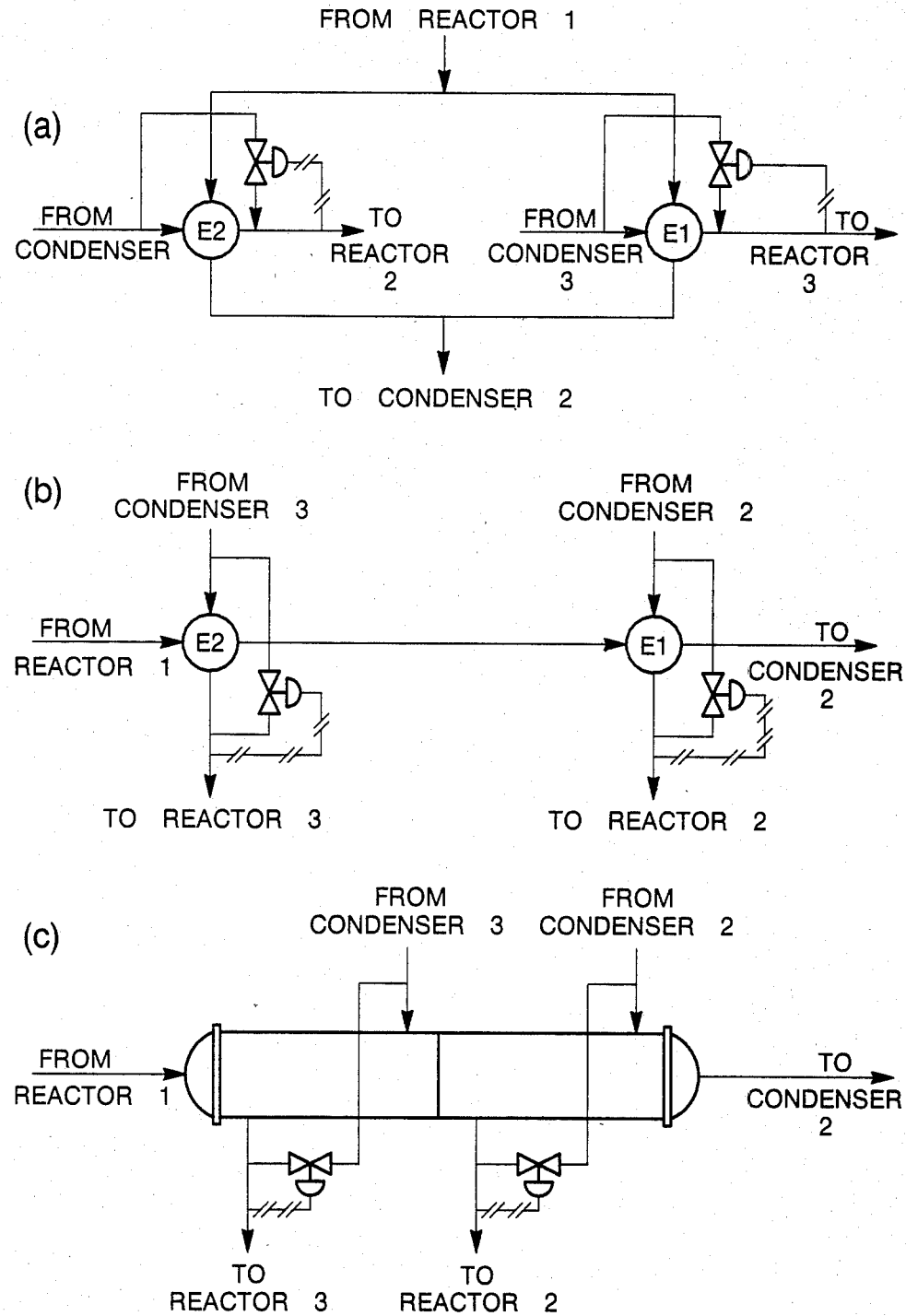
FIG. 4 depicts possible reheat exchanger configurations using reactor 1 effluent as the heat source.

FIG. 4 shows possible reheat exchanger arrangements. FIG. 4 (a) illustrates that the effluent from first catalytic reactor (R1) can be provided in parallel to the first exchanger E1 and the second exchanger E2. FIG. 4(b) shows that the effluent from reactor 1 can be provided in series to second exchanger E2 and first exchanger E1; and FIG. 4(c) shows a series arrangement as in FIG. 4(b) where both exchangers are enclosed in a single shell. The least expensive method may be FIG. 4(c) using only one shell. Note that the high effluent temperature from the first catalytic reactor (Reactor 1) may require special materials of construction in part of the plant. For this reason, alloy tubes should probably be used in the exchanger, and either alloy steel or refractory lined carbon steel piping should be used between the first catalytic reactor (Reactor 1) and the exchanger.

The following examples are provided for illustrative purposes and are not intended to limit the claimed invention in any manner.

EXAMPLE I

The theoretical recoveries of sulfur were calculated for the process of the present invention for the following operating conditions and a 58% $H_2S$ acid gas having below specified composition.

Operation Conditions

Recovery Mode
  Feed to the first catalytic reactor 116 at about 565° F. (296° C.).
  Feed to the second catalytic reactor 133 at about 379° F. (193° C.).
  Feed to the third catalytic reactor 153 at about 260° F. (127° C.).

Regeneration Mode
  Feed to the first catalytic reactor 116 at about 565° F. (296° C.).
  Feed to the second catalytic reactor 133 at about 379° F. (193° C.).
  Feed to the third catalytic reactor 153 at about 650° F. (343° C.).

| Composition of Acid Gas | |
|---|---|
| Component | Lb. Mols/hr. |
| $H_2S$ | 371.00 |
| $CO_2$ | 65.12 |
| $H_2O$ | 26.62 |
| $CH_4$ | 1.00 |

The following theoretical sulfur recoveries were obtained:

| Period | Time (Hours) | Sulfur Recovery (Weight %) |
|---|---|---|
| Recovery Mode | 23.2 | 99.24 |
| Regeneration Mode | | |
| Heating | 1.5 | 97.47 |
| Plateau | 1.0 | 91.78 |
| Soaking | 4.0 | 95.54 |

-continued

| Period | Time (Hours) | Sulfur Recovery (Weight %) |
|---|---|---|
| Cooling | 2.0 | 97.39 |
| | Total 31.7 | Avg. 98.34% |

This example demonstrates that when an acid gas containing 58% of $H_2S$ is used, the average recoveries above 98 weight percent can be achieved using the process and the system of the present invention and that the recoveries of sulfur fall below 97% only for a short period of time.

Example II

The theoretical recovery levels of sulfur were calculated for the system operating at the conditions specified in Example I for an 80% $H_2S$ acid gas having the composition specified below.

| Composition of Acid Gas | |
|---|---|
| Component | Lb. Mols/hr. |
| $H_2S$ | 226.8 |
| $CO_2$ | 180.3 |
| $H_2O$ | 26.62 |
| $CH_4$ | 1.00 |

The following theoretical recovery levels were obtained:

| Period | Time (Hours) | Sulfur Recovery (Weight %) |
|---|---|---|
| Recovery Mode | 22.3 | 99.42 |
| Regeneration Mode | | |
| Heating | 1.5 | 97.80 |
| Plateau | 1.0 | 92.41 |
| Soaking | 4.0 | 96.14 |
| Cooling | 2.0 | 97.78 |
| | Total 30.8 | Avg. 98.58% |

This example demonstrates that when an acid gas containing 80% of $H_2S$ is used, the average recovery of sulfur is above 98.5 weight percent using the process and thr system of the present invention. The recovery rate falls to below 97% only for a short period of time during regeneration.

Many changes and modifications will occur to those skilled in the art upon studying this disclosure. All such changes and modifications that fall within the spirit of this invention are intended to be included within its scope as defined by the appended claims.

I claim:

1. In an improved modified Claus reactor process of the type including the steps of reacting acid gas and air in a thermal reaction zone, reacting the resulting gas in a plurality of catalytic reaction zones arranged in series and maintained at progressively reduced temperatures, sulfur being removed in cooling zones between said reaction zones, the last of said catalytic reaction zones being maintained below the dew point of sulfur, the improvement comprising:

(a) operating only three catalytic reaction zones in series, two catalytic reaction zones above the dewpoint of sulfur and a last catalytic reaction zone below the dewpoint of sulfur for the recovery of sulfur and when the catalyst loading in said last catalytic reaction zone reaches a preselected level, heating the effluent from the cooling zone immediately preceding said last catalytic reaction zone to produce a regeneration gas;

(b) feeding said regenerating gas to said last catalytic reaction zone until the catalyst is regenerated, the steps of producing and feeding a regeneration gas to said last catalytic reaction zone being carried out only for as long as necessary to regenerate the catalyst.

2. The process of claim 1 wherein heating of the effluent from the cooling zone immediately preceding said last catalytic zone is effected by heat exchange with the effluent from the first catalytic reaction zone.

3. The process of claim 1 wherein the said effluent is heated in step (a) to the temperature in the range of about 625°–675° F. (329°–357° C.).

4. The process of claim 2 wherein said effluent is heated in step (a) to the temperature in the range of about 625°–675° F. (329°–357° C.).

5. An improved process for producing and recovering elemental sulfur from acid gas, said process comprising:

(a) reacting acid gas and air in a thermal reaction zone maintained at such conditions so as to facilitate the Claus reaction, to produce elemental sulfur vapor;

(b) cooling the gas produced in the thermal reaction zone to condense the elemental sulfur vapor and recovering elemental sulfur therefrom; then, (c) heating the cooled gas; then, (d) reacting the heated gas, in the presence of a catalyst for facilitating the Claus reaction, in a first catalytic reaction zone to produce vaporized elemental sulfur therein;

(e) cooling the gas produced in the first catalytic reaction zone to condense the elemental sulfur vapor and recovering elemental sulfur therefrom, then, (f) heating the cooled gas; then, (g) reacting the heated gas, in the presence of a catalyst for facilitating the Claus reaction, in a second catalytic reaction zone to produce vaporized elemental sulfur therein;

(h) cooling the gas produced in the second catalytic reaction zone to condense the elemental sulfur vapor and recovering elemental sulfur therefrom; then, (i) reacting the cooled gas, in the presence of a catalyst for facilitating a Claus reaction to produce elemental sulfur, in a third catalytic reaction zone to produce elemental sulfur on said catalyst, and cooled gas in step (h) being at a temperature sufficiently low to permit the reaction in the third catalytic reaction zone to proceed below the dew point of elemental sulfur;

(j) cooling the gas from the third catalytic reaction zone; then, (k) discharging the effluent produced in step (j);

(l) continuing steps (a) through (k), inclusive, until the instantaneous recovery of elemental sulfur falls below a predetermined value; then (m) heating the gas of step (h) to a temperature sufficiently high to allow regeneration of catalyst but sufficiently low to avoid damaging the catalyst, to produce a regeneration gas and passing said regeneration gas to the third catalytic reaction zone to regenerate the catalyst therein;

(n) cooling the gas from the third catalytic reaction zone to condense elemental sulfur vapor and recovering sulfor therefrom; then, (o) discharging the cooled gas, steps (m) through (o), inclusive, being carried out only until the catalyst is regenerated in the third catalytic reaction zone, step (l) being carried out the rest of the time.

6. The process of claim 5 wherein heating in step (m) is effected by passing the effluent from the first catalytic reactor as a heating medium through a first heat exchanger zone such that the heating medium heats said gas of step (h).

7. The process of claim 6 wherein heating in step (f) is effected by passing the heating medium from the first heat exchanger zone to a second heat exchanger zone such that said heating medium heats said gas of step (e).

8. The process of claim 5 wherein heating in step (f) is effected by passing the effluent from the first catalytic reactor as a heating medium to second heat exchanger zone such that said heating medium heats said gas of step (e).

9. The process of claim 5 wherein the gas in step (c) is heated to the temperature in the range of about 450°–650° F. (232°–343° C.) and the gas in step (f) is heated to the temperature in the range of about 350°–420° F. (177°–216° C.), the gas in step (m) is heated to the temperature in the range of about 625°–675° F. (329°–357° C.).

* * * * *